(12) United States Patent
Astigarraga et al.

(10) Patent No.: US 10,740,382 B2
(45) Date of Patent: Aug. 11, 2020

(54) SENTIMENT ANALYSIS AS A QUALITY INDICATOR IN USABILITY TESTING

(71) Applicant: INTERNATIONAL BUSINESS MACHINES CORPORATION, Armonk, NY (US)

(72) Inventors: Tara Astigarraga, Fairport, NY (US); Raquel Maldonado Cabrera, Zapopan (MX); Jose R. Mosqueda Mejia, Michoacan (MX); Shariffa B. Siewrattan, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 15/627,868

(22) Filed: Jun. 20, 2017

(65) Prior Publication Data
US 2018/0365241 A1    Dec. 20, 2018

(51) Int. Cl.
*G06F 16/00* (2019.01)
*G06F 16/435* (2019.01)
*G06Q 30/02* (2012.01)

(52) U.S. Cl.
CPC ....... *G06F 16/436* (2019.01); *G06Q 30/0278* (2013.01)

(58) Field of Classification Search
CPC ...................................................... G06F 16/00
See application file for complete search history.

(56) References Cited

U.S. PATENT DOCUMENTS

| | | | |
|---|---|---|---|
| 7,930,676 B1 | 4/2011 | Thomas | |
| 2015/0058615 A1* | 2/2015 | Lee | G06F 3/015 713/100 |
| 2016/0057565 A1* | 2/2016 | Gold | H04L 67/12 455/41.1 |
| 2016/0210222 A1* | 7/2016 | Wyld | G06F 11/3672 |
| 2016/0260143 A1* | 9/2016 | Ekambaram | G06K 9/00302 |
| 2017/0041296 A1* | 2/2017 | Ford | G06F 16/951 |

OTHER PUBLICATIONS

Raviart, "Infosys Applying AI to Test Automation," LinkedIn, Jun. 7, 2016 (2 pages).

* cited by examiner

*Primary Examiner* — Khanh B Pham
(74) *Attorney, Agent, or Firm* — Griffiths & Seaton PLLC

(57) ABSTRACT

Various embodiments for enhancing accuracy in usability testing, by a processor device, are provided. Sentiment information is collected by a wearable device configured to be worn by a test user while a set of operations of a test case are executed, the test case evaluating usability of a product or service. Upon completion of the set of operations, a quality for the evaluation of the usability is determined using the sentiment information collected from the wearable device corresponding to input received from the executed set of operations.

18 Claims, 4 Drawing Sheets

SENTIMENT ANALYSIS AS A QUALITY INDICATOR IN USABILITY TESTING

BACKGROUND OF THE INVENTION

Field of the Invention

The present invention relates generally to testing products or services for usability, and more specifically to using sentiment analysis in software testing as a key quality level indicator for usability.

Description of the Related Art

Products or services (e.g., software) are sometimes tested on users through a technique called "usability testing". In the industry, this testing is often viewed as an essential method of gaining direct input on how real users use products or software, and is therefore generally considered a near-mandatory practice that must be completed in order to release truly optimized products. The reasoning for giving such importance to usability testing is that without knowing how users use the software or product, the software or product's interactive elements cannot be accurately tailored to the user to carry out the ultimate purpose of such in the most efficient and convenient way.

SUMMARY OF THE INVENTION

Various embodiments for enhancing accuracy in usability testing, by a processor device, are provided. In one embodiment, a method comprises collecting sentiment information by a wearable device configured to be worn by a test user while a set of operations of a test case are executed, the test case evaluating usability of a product or service. Upon completion of the set of operations, a quality for the evaluation of the usability is determined using the sentiment information collected from the wearable device corresponding to input received from the executed set of operations.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
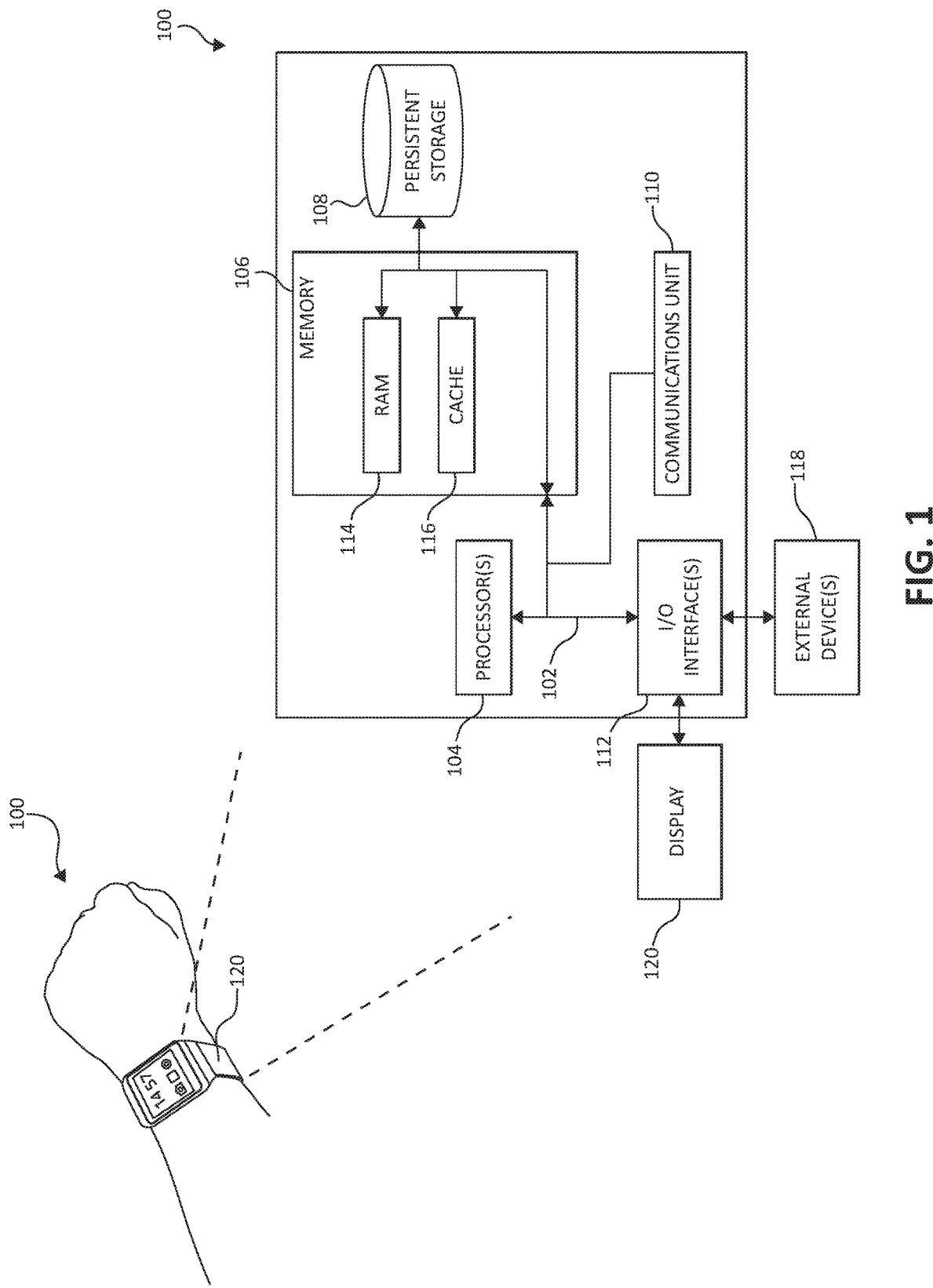
FIG. 1 is a block diagram showing a hardware structure of a mobile/wearable electronic device, in which aspects of the present invention may be realized.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

As aforementioned, products or services (e.g., software) are sometimes tested on users through a technique called "usability testing". In the industry, this testing is often viewed as an essential method of gaining direct input on how real users use products or software, and is therefore generally considered a near-mandatory practice that must be completed in order to release truly optimized products. The reasoning for giving such importance to usability testing is that without knowing how users use the software or product, the software or product's interactive elements cannot be accurately tailored to the user to carry out the ultimate purpose of such in the most efficient and convenient way.

Usability of the application (software/product/service) can be measured by effectiveness, efficiency, and/or satisfaction, among other measurements. Effectiveness of the application can include the accuracy and completeness with which a user can complete a task in a particular environment. Efficiency can include the resources expended in relation to the accuracy and completeness of the completed task. Satisfaction can include the comfort and acceptability of the work of the system, the user, and others affected by its use.

In practice, usability testing is commonly performed by a testing team representative of a broad swath of final users of the product or service. The testing may be evaluated within a controlled laboratory environment or externally in a "real-world" scenario. With experience of the test user ("tester") and knowledge of the context of the application, the testing team could approximate fairly well a good "usability" for the application by general users. However, factors such as tight deadlines, undocumented requirements, and different biases that can come with individual experience, a testing team could be inadvertently ignoring their instincts when doing usability testing and thereby providing an incomplete, inaccurate, or false usability rating for the application.

A common technique in usability testing is to provide a "task script" in the form of checklists or surveys to the test user of the testing team. The test user is then asked to use the application and answer questions associated with usability of the application such as: How easy was performing an update in the application?—or—How easy was the login process?, etc.

The negative aspect of using this method is that each answer depends on the tester's point of view of the rating system and what he or she remembers about the process. Thus, a quick answer to these questions, especially when a lot of questions are asked successively, may not provide accurate details of the test user's feelings about the different "transactions", or tasks completed while performing the usability testing. Additionally, external factors associated with an individual's environment which may affect a test user's general mood or attitude are not represented in the final answers or impressions the test user inputs to determine the usability of the application.

Accordingly, and in view of the foregoing, a method is contemplated herein for enhancing accuracy in usability testing. The mechanisms provided include such functionality as executing, by a test user, a set of operations corresponding to a test case in an application. While the test user is executing the set of operations, sentiment information (information related to a mood, attitude, or physiological state) is collected from the test user via a wearable device (e.g., smartwatch) which is worn by the test user. Upon completion of the set of operations, a quality for the evaluation of the usability is determined using the sentiment information collected from the wearable device correlated to input received from the set of operations executed by the test user. That is, the sentiment information collected from the wearable device is analyzed to determine the accuracy or "validity" of the answers provided by the test user thereby evaluating a "quality" of each transaction of the test case the test user participated in. These mechanisms and additional functionality will be described in detail, following.

Turning first to FIG. 1, a block diagram showing a hardware structure of a mobile electronic device (otherwise referred to as a wearable device or "smartwatch") 100 is illustrated, in accordance with aspects of the present invention. It should be appreciated that FIG. 1 provides only an illustration of one implementation and does not imply any limitations with regard to the environments in which different embodiments may be implemented. Many modifications to the depicted environment may be made.

Mobile electronic device 100 includes communications fabric 102, which provides communications between computer processor(s) 104, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer-readable storage media. In one embodiment, memory 106 includes random access memory (RAM) 114 and cache memory 116. In general, memory 106 can include any suitable volatile or non-volatile computer-readable storage media.

The functionality described herein may be provided via an application(s) or module(s) stored in persistent storage 108 of mobile electronic device 100 for execution and/or access by one or more of the respective computer processors 104 via one or more memories of memory 106 of mobile electronic device 100. In one embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer-readable storage medium that is also part of persistent storage 108.

Communications unit 110, in these examples, provides for communications with other servers, data processing systems, or devices. In these examples, communications unit 110 includes one or more network interface cards. Communications unit 110 may provide communications through the use of either or both physical and wireless communications links.

I/O interface(s) 112 allows for input and output of data with other devices that may be connected to mobile electronic device 100. For example, I/O interface 112 may provide a connection to external devices 118 such as a keyboard, keypad, a touch screen, and/or some other suitable input device. External devices 118 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 108 of mobile electronic device 100 via I/O interface(s) 112. I/O interface(s) 112 may also connect to a display 120. Display 120 provides a mechanism to display data to a user and may be, for example, a computer monitor or a touch screen.

Figure 2:
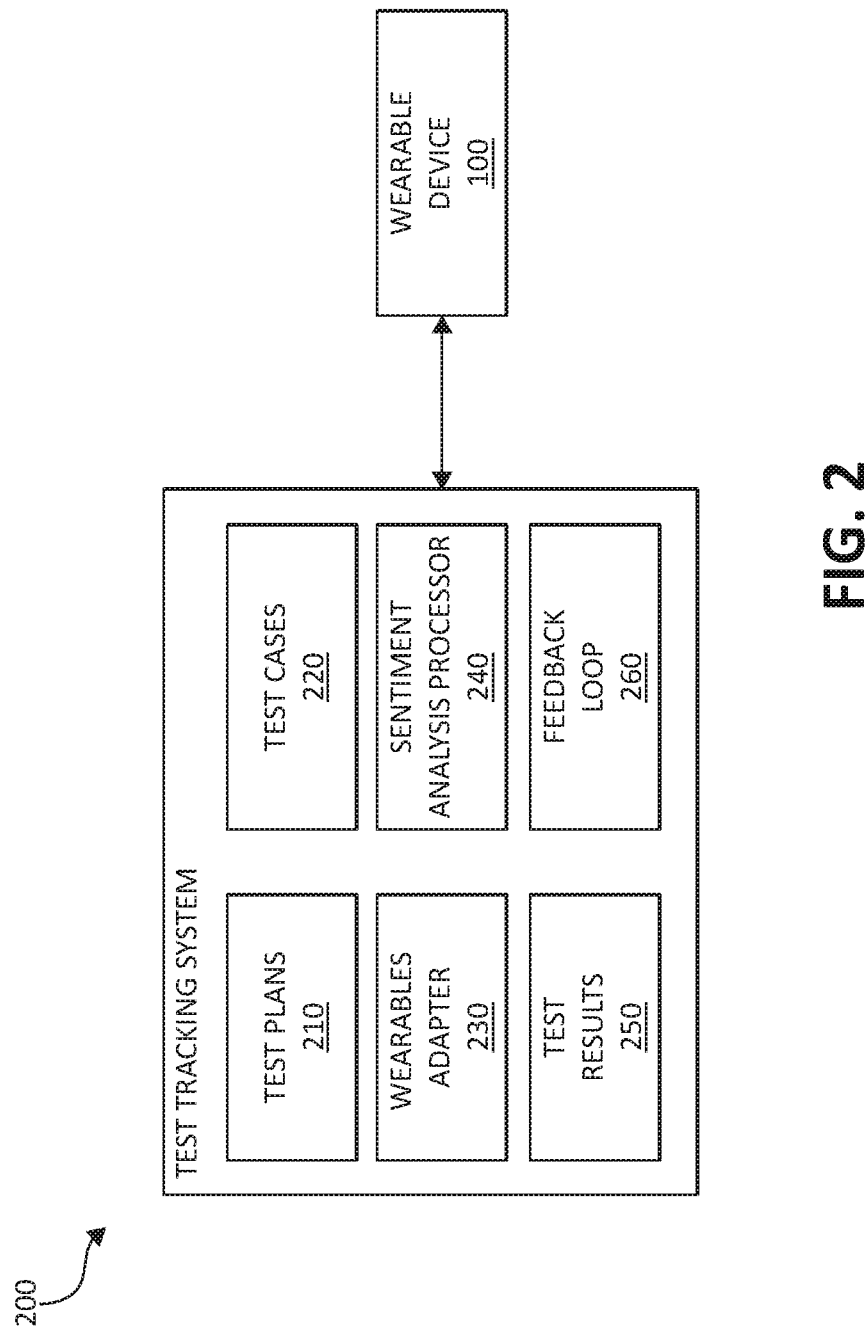
FIG. 2 is a high-level block diagram illustrating components in a system for enhancing accuracy in usability testing, in accordance with various aspects of the present invention.

Advancing, FIG. 2 is a high-level block diagram illustrating components in a test tracking system 200 for enhancing accuracy in usability testing, in accordance with various aspects of the present invention. The system 200 may be used in accordance with the present invention in any of the environments depicted in FIG. 1, among others, in various embodiments. Of course, more or less operations than those specifically outlined in FIG. 2 may be included in system 200, as would be understood by one of skill in the art upon reading the present descriptions.

Each of the modules of the system 200 may be implemented by any suitable component of the operating environment. For example, in various embodiments, the system 200 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the system 200. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Test tracking system 200 is illustrated representative of components used for test tracking and execution of the usability testing (e.g., using a testing application such as IBM® Rational Quality Manager™). As the functionality of which will be discussed, following, test tracking system 200 includes a test plan component 210, in which test plans are created, managed, and updated for the testing application; and test case component 220 is then used to create, manage, and update each test case to be executed for each created test plan (e.g., by an administrator). A wearables adaptor component 230 is implemented in combination with the testing application and is used as a communications channel between the testing application and the wearable device 100 worn by the test user. This communications channel may include a hardwired and/or a wireless (e.g., Bluetooth™, Wi-Fi, cellular, etc.) connection established between the wearable device 100 and the testing application.

In one embodiment, a sentiment analysis processor 240 is used to analyze sentiment information collected using the wearable device 100 via the wearables adaptor 230. The sentiment analysis processor 240 analyzes the sentiment information to determine how the mood, attitude, or general disposition of the test user changed during the execution of the test cases of the test plan, and uses this analyzed sentiment data to calculate a general rate for the quality of each transaction, or accomplished task in the test case, being tested based upon both answers or responses provided by the test user in each transaction of the test case combined with the sentiment information analyzed into the sentiment data by the sentiment analysis processor 240. The sentiment information should be noted as comprising any relevant physiological data or information affecting a test user and as commonly collected by wearable devices known in the art. For example, in some embodiments, the sentiment data collected by the wearable device 100 and analyzed by the sentiment analysis processor 240 may comprise vital signs of the test user, such as pulse rate, blood oxygen saturation, body temperature, respiratory rate, etc. In some embodiments, skin moisture levels, blood pressure, physical location, body movements (both the frequency and rigor thereof), ambient or abrupt surrounding sound levels, room or surrounding air temperature (or variations thereof), time of day (and/or week and month), surrounding lighting conditions, or other such measurements may be collected by the wearable device 100 and used by the sentiment analysis processor 240 for determining the analyzed sentiment data. Indeed, any portion of relevant information associated with the physiological state of the test user may be collected by the wearable device 100 and analyzed by the sentiment analysis processor 240.

The test tracking system additionally includes a test result component 250 for creating, compiling, and managing testing results of the test execution by the test user, and a feedback loop component 260 for managing feedback provided by the test user regarding the accuracy of the rate assigned by the sentiment analysis processor 240. For example, the feedback loop component 260 implements functionality wherein test users may provide feedback regarding external factors either relevant or irrelevant to the transactions of the test case which may have impacted their mood or attitude during their execution. By providing this feedback, the sentiment analysis processor 240 is able to, for example, give less "weight" to a particular transaction executed by the test user if the test user, through the feedback, explains that an external situation impacted their mood or temperament while performing the particular transaction.

Figure 3:
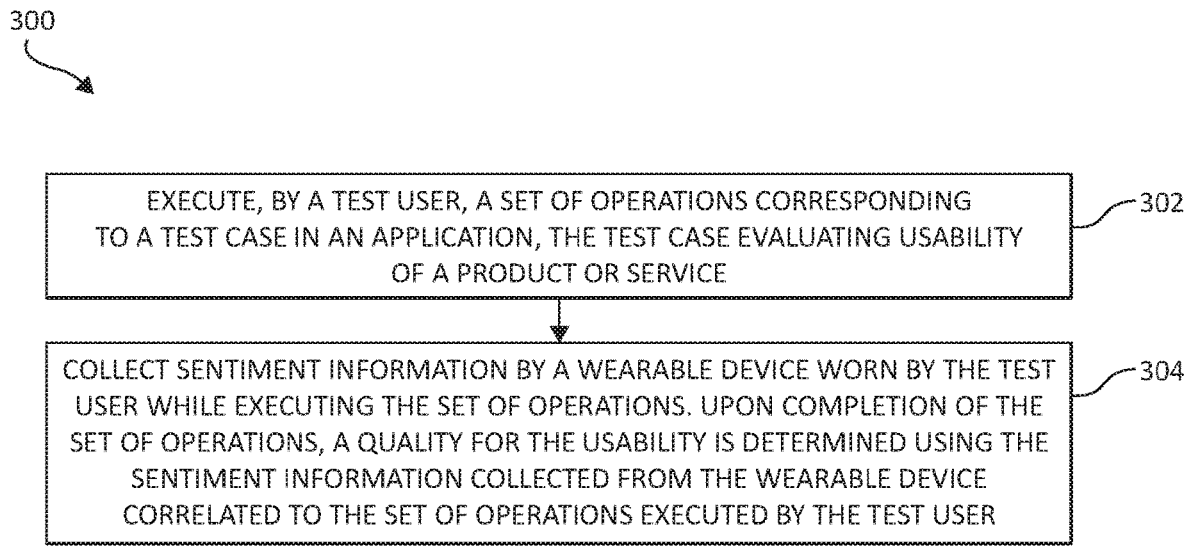
FIG. 3 is a flow chart diagram illustrating a method for enhancing accuracy in usability testing, in accordance with various aspects of the present invention.

FIG. 3 is a flow chart diagram illustrating a method 300 for enhancing accuracy in usability testing, in accordance with various aspects of the present invention. The method 300 may be performed in accordance with the present invention in any of the environments depicted in FIG. 1, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning, a set of operations corresponding to a test case in an application is executed by a test user, where the test case evaluates usability of a product or service (step 302). Sentiment information is collected by a wearable device (e.g., wearable device 100) worn by the test user while executing the set of operations. Upon completion of the set of operations, a quality for the evaluation of the usability is determined using the sentiment information collected from the wearable device 100 correlated to input received from the set of operations executed by the test user (step 304). The method 300 ends.

As aforementioned, the present invention employs functionality to, among other aspects, use sentiment analysis of a test user performing operations or transactions of a test case to more accurately reflect a general mood, feeling, or disposition the test user experiences in conjunction with answers input for each transaction of the test case. By analyzing this sentiment information, which is collected by the wearable device 100 worn by the test user, a quality level in terms of usability of each transaction can be determined as to whether the transaction was positively or negatively impacted depending on how the mood of the test user changed when performing or executing the particular transaction. Thus, an overall quality for the test case may be determined by providing more or less weight to answers or input provided by the test user in each transaction of the test case.

Additionally, the usage of sentiment analysis as a key indicator of the quality level of the application's transactions may thereby be used to evaluate the "real world" usability of the application. It is important to note that the application under test may be a software application executed in a computing environment, a service provided by the computing environment (e.g., a cloud service), or a physical product or good (e.g., a vacuum cleaner, refrigerator, oven, etc.). Indeed, the functionality provided herein may be adapted for a wide range of usability testing applications whether electronically related or otherwise.

Figure 4:
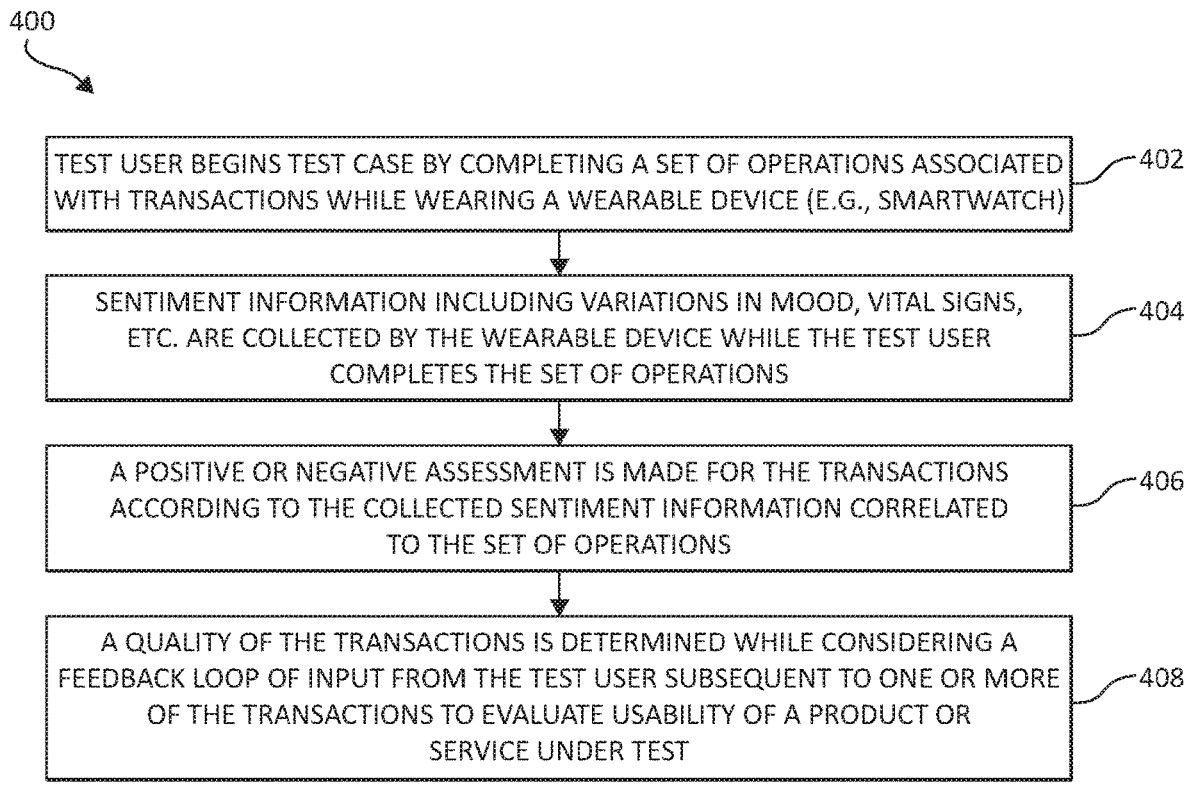
FIG. 4 is an additional flow chart diagram illustrating a method for enhancing accuracy in usability testing, in accordance with various aspects of the present invention.

Continuing, FIG. 4 is an additional flow chart diagram illustrating a method 400 for enhancing accuracy in usability testing, in accordance with various aspects of the present invention. The method 400 may be performed in accordance with the present invention in any of the environments depicted in FIGS. 1 and 2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 400 begins by a test user commencing a test case in which a set of operations associated with transactions of an application are completed by the test user while wearing a wearable device (e.g., wearable device or "smartwatch" 100) (step 402). Sentiment information of the test user is collected by the wearable device 100 while the test user completes the set of operations (step 404). As aforementioned, the sentiment data collected by the wearable device 100 may comprise vital signs of the test user (such as pulse rate, blood oxygen saturation, body temperature and respiratory rate), skin moisture levels, blood pressure, physical location, body movements (both the frequency and rigor thereof), ambient or abrupt surrounding sound levels, room or surrounding air temperature (or variations thereof), time of day (and/or week and month), surrounding lighting conditions, or other physiological measurements may be collected by the wearable device 100 and used by the sentiment analysis processor 240 for determining the analyzed sentiment data.

The sentiment data collected by the wearable device 100 is analyzed by a sentiment analysis processing component (e.g., sentiment analysis processor 240) comprised within a server and in active communication with the wearable device 100 via a hardwired and/or wireless communication channel (e.g., wearables adapter 230) to provide a positive or negative assessment for each transaction of the set of operations of the test case (step 406). Upon completion of each particular transaction of the test case, the test user may be provided the opportunity to input feedback related to external factors unknown to the server which are irrelevant to the testing environment, or, external factors unknown to the server which may potentially be relevant to the testing environment.

For example, a test user may complete a transaction in which the user was asked about a particular aspect of the application, product, or service under test (e.g., "Did you find using the erase tool convenient?"). During the execution of the transaction, or otherwise performing the operation of using the erase tool, the test user may have received a phone call or text message of an unrelated and discouraging subject. Thus, when providing the sentiment information from the wearable device 100, an inaccurate or false reading may be provided regarding the transaction in query because the test user experienced an emotional response to a situation unrelated to the transaction itself. In this instance, the test user may provide feedback to "disregard" or apply "less weight" so to speak to their input of the particular transaction because the test user is aware that a bias has been recorded in the sentiment data which is unrelated to the testing application.

Using the input of the test user regarding each transaction in addition to feedback provided by the test user associated with whether their physiological response was indeed accurate regarding each transaction, a quality, or veracity of each of the transactions of the test case is then determined when considering the overall usability of the application under test (step 408). The method 400 ends.

Figure 5:
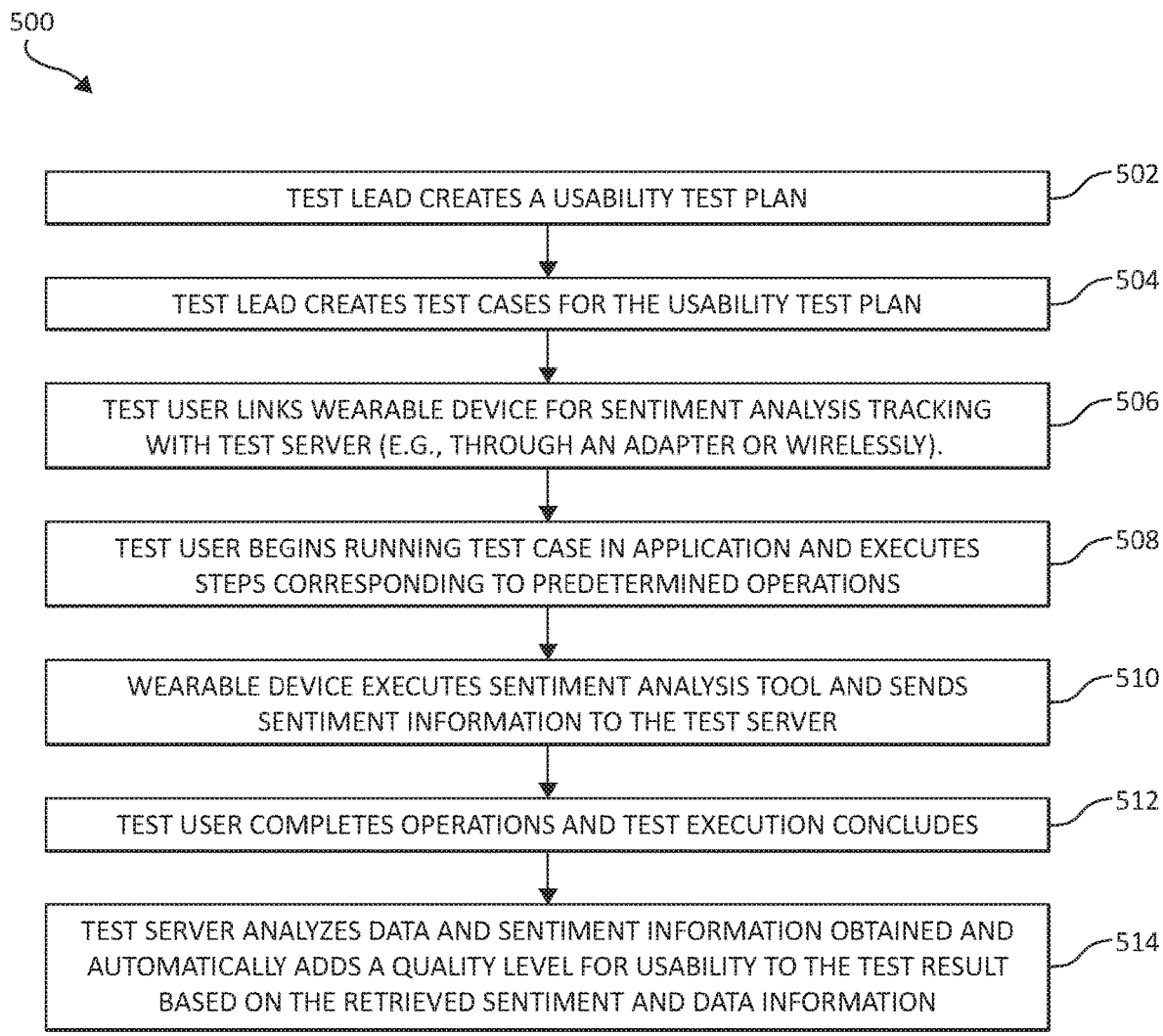
FIG. 5 is still an additional flow chart diagram illustrating a method for enhancing accuracy in usability testing, in accordance with various aspects of the present invention.

Concluding, FIG. 5 is an additional flow chart diagram illustrating a method 500 for enhancing accuracy in usability testing, in accordance with various aspects of the present invention. The method 500 may be performed in accordance with the present invention in any of the environments depicted in FIGS. 1 and 2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 is illustrated as an exemplary implementation of the mechanisms provided herein which may be employed in such applications as the IBM® Rational Quality Manager™ (RQM), and begins with a test lead creating a usability test plan (step 502). When creating the usability test plan, the test lead creates test cases which provide the operations necessary to be performed and transactions of the operations to be queried to obtain a thorough evaluation of usability of the application under test (step 504). A test user wearing a wearable device (e.g., wearable device 100) links the wearable device 100 via a hardwired and/or wireless communications channel (e.g., wearables adapter 230) for sentiment analysis tracking with a test server (e.g., RQM server) (step 506). The test user begins running the test case administered by the test server and commences executing steps corresponding to predetermined operations of the test case of the application (step 508).

While the test user is executing the test case, the wearable device 100 collects sentiment information from the test user and transmits the sentiment information to the test server for analysis via the communications channel. Additionally, the test user may provide feedback to the test server regarding external factors, biases, or situations which may impact (positively or negatively) a particular transaction of the test case (step 510). The test user completes the operations of the test case and the test execution concludes (step 512). Upon conclusion of the test execution, the test server analyzes the sentiment information obtained from the test user to create analyzed sentiment data while factoring in any feedback presented by the user as to whether additional or less weight should be applied to any particular transaction of the test case because of the external factors experienced (step 514). The test server then automatically adds to the test result a quality level for usability based on the analyzed sentiment data combined with the input provided by the test user of the transactions of the test case. This quality level may be implemented in the form of a "score" or value associated with a determined accuracy or validity of the answers provided by the test user in response to queries of each transaction correlated to the predetermined operations executed by the test user. The method 500 ends.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enhancing accuracy in usability testing, by a processor device, comprising:
    collecting sentiment information by a first device comprising a wearable device configured to be worn by a test user while a set of operations of a test case are executed on a second device comprising a computing system being separate from notwithstanding in communication with the wearable device, the test case evaluating usability of a product or service; wherein, for collecting the sentiment information, the wearable device detects and acquires multiple physiological inputs including at least one of a plurality of vital signs of the test user, and wherein each operation of the set of operations comprises a predefined task related to a different aspect of a usage of the product or service performed by the test user;
    upon completion of the set of operations, providing the test user with a survey having predetermined questions associated with one or more of the predefined tasks of the set of operations; wherein the test user provides input on the computing system to answer each of the predetermined questions of the survey; and
    in response to the test user completing the survey, determining a quality for the evaluation of the usability using the sentiment information collected from the wearable device by correlating the input received from each answer in the survey associated with a respective predefined task to the sentiment information collected during a performance of the respective predefined task such that the quality describes a veracity of the input by the test user as each of the operations are executed.

2. The method of claim 1, further including transmitting the collected sentiment information from the wearable device to a server.

3. The method of claim 2, further including executing, by the server, a sentiment analysis of the collected sentiment information to create analyzed sentiment data identifying corresponding physiological changes observed from the test user while the set of operations are executed.

4. The method of claim 3, further including calculating a value for the quality of a transaction of the test case using the collected sentiment information.

5. The method of claim 4, further including, responsive to the completion of the set of operations, automatically adding the value to a test result by the server; wherein the value added to the test result indicates the quality for the evaluation of usability.

6. The method of claim 4, further including, when calculating the value for the quality of the transaction, accounting for feedback input by the test user upon completion of the transaction; wherein the feedback input weights any specified external factors relevant or irrelevant to the calculation of the value for the quality of the transaction.

7. A system for enhancing accuracy in usability testing, the system comprising:
    a processor device executing instructions stored in a memory, wherein the processor device:
        collects sentiment information by a first device comprising a wearable device configured to be worn by a test user while a set of operations of a test case are executed on a second device comprising a computing system being separate from notwithstanding in communication with the wearable device, the test case evaluating usability of a product or service; wherein, for collecting the sentiment information, the wearable device detects and acquires multiple physiological inputs including at least one of a plurality of vital signs of the test user, and wherein each operation of the set of operations comprises a predefined task related to a different aspect of a usage of the product or service performed by the test user;
        upon completion of the set of operations, provides the test user with a survey having predetermined questions associated with one or more of the predefined tasks of the set of operations; wherein the test user provides input on the computing system to answer each of the predetermined questions of the survey; and
        in response to the test user completing the survey, determines a quality for the evaluation of the usability using the sentiment information collected from the wearable device by correlating the input received from each answer in the survey associated with a respective predefined task to the sentiment information collected during a performance of the respective predefined task such that the quality describes a veracity of the input by the test user as each of the operations are executed.

8. The system of claim 7, wherein the processor device transmits the collected sentiment information from the wearable device to a server.

9. The system of claim 8, wherein the processor device executes, by the server, a sentiment analysis of the collected sentiment information to create analyzed sentiment data identifying corresponding physiological changes observed from the test user while the set of operations are executed.

10. The system of claim 9, wherein the processor device calculates a value for the quality of a transaction of the test case using the collected sentiment information.

11. The system of claim 10, wherein the processor device, responsive to the completion of the set of operations, automatically adds the value to a test result by the server; wherein the value added to the test result indicates the quality for the evaluation of usability.

12. The system of claim 10, wherein the processor device, when calculating the value for the quality of the transaction, accounts for feedback input by the test user upon completion of the transaction; wherein the feedback input weights any specified external factors relevant or irrelevant to the calculation of the value for the quality of the transaction.

13. A computer program product for enhancing accuracy in usability testing, by a processor device, the computer program product embodied on a non-transitory computer-readable storage medium having computer-readable program code portions stored therein, the computer-readable program code portions comprising:
    an executable portion that collects sentiment information by a first device comprising a wearable device configured to be worn by a test user while a set of operations of a test case are executed on a second device comprising a computing system being separate from notwithstanding in communication with the wearable device, the test case evaluating usability of a product or service; wherein, for collecting the sentiment information, the wearable device detects and acquires multiple physiological inputs including at least one of a plurality of vital signs of the test user, and wherein each operation of the set of operations comprises a predefined task related to a different aspect of a usage of the product or service performed by the test user;

an executable portion that, upon completion of the set of operations, provides the test user with a survey having predetermined questions associated with one or more of the predefined tasks of the set of operations; wherein the test user provides input on the computing system to answer each of the predetermined questions of the survey; and an executable portion that, in response to the test user completing the survey, determines a quality for the evaluation of the usability using the sentiment information collected from the wearable device by correlating the input received from each answer in the survey associated with a respective predefined task to the sentiment information collected during a performance of the respective predefined task such that the quality describes a veracity of the input by the test user as each of the operations are executed.

14. The computer program product of claim 13, further including an executable portion that transmits the collected sentiment information from the wearable device to a server.

15. The computer program product of claim 14, further including an executable portion that executes, by the server, a sentiment analysis of the collected sentiment information to create analyzed sentiment data identifying corresponding physiological changes observed from the test user while the set of operations are executed.

16. The computer program product of claim 15, further including an executable portion that calculates a value for the quality of a transaction of the test case using the collected sentiment information.

17. The computer program product of claim 16, further including an executable portion that, responsive to the completion of the set of operations, automatically adds the value to a test result by the server; wherein the value added to the test result indicates the quality for the evaluation of usability.

18. The computer program product of claim 16, further including an executable portion that, when calculating the value for the quality of the transaction, accounts for feedback input by the test user upon completion of the transaction; wherein the feedback input weights any specified external factors relevant or irrelevant to the calculation of the value for the quality of the transaction.

* * * * *